May 2, 1967

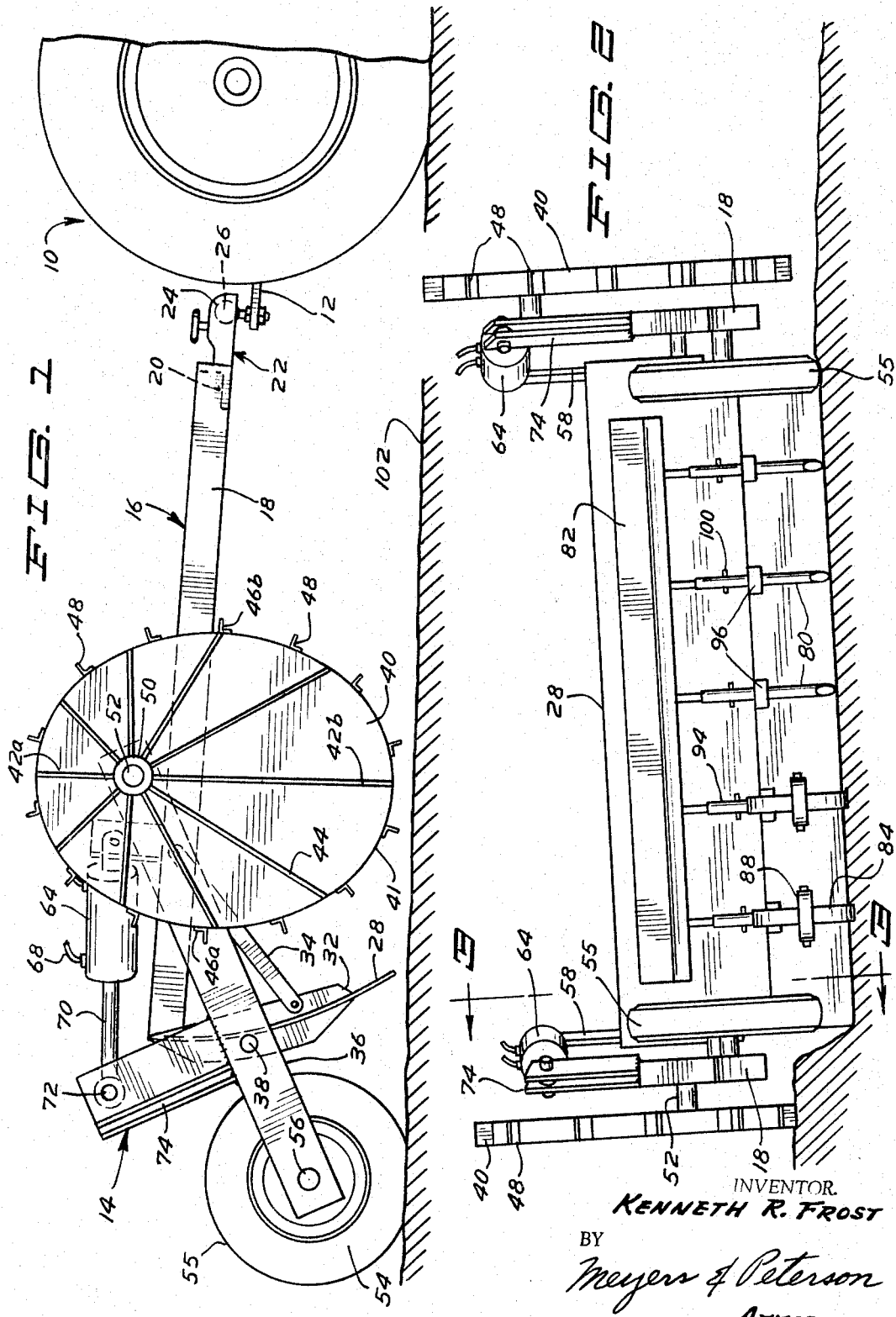

K. R. FROST 3,316,980

BASIN FORMING MACHINE FOR RANGE RESEEDING

Filed July 15, 1964

INVENTOR.
KENNETH R. FROST

BY Meyers & Peterson

ATTORNEYS

May 2, 1967  K. R. FROST  3,316,980
BASIN FORMING MACHINE FOR RANGE RESEEDING
Filed July 15, 1964  3 Sheets-Sheet 3
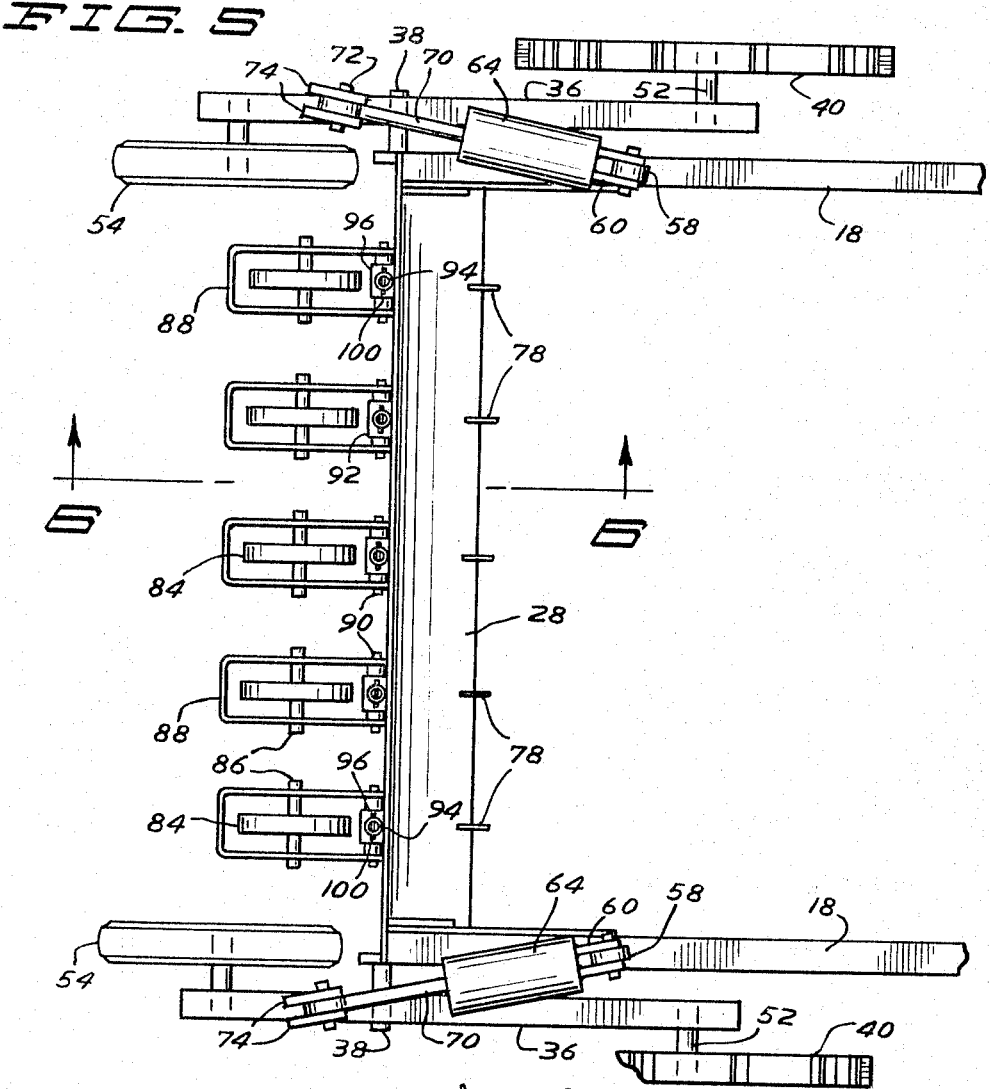
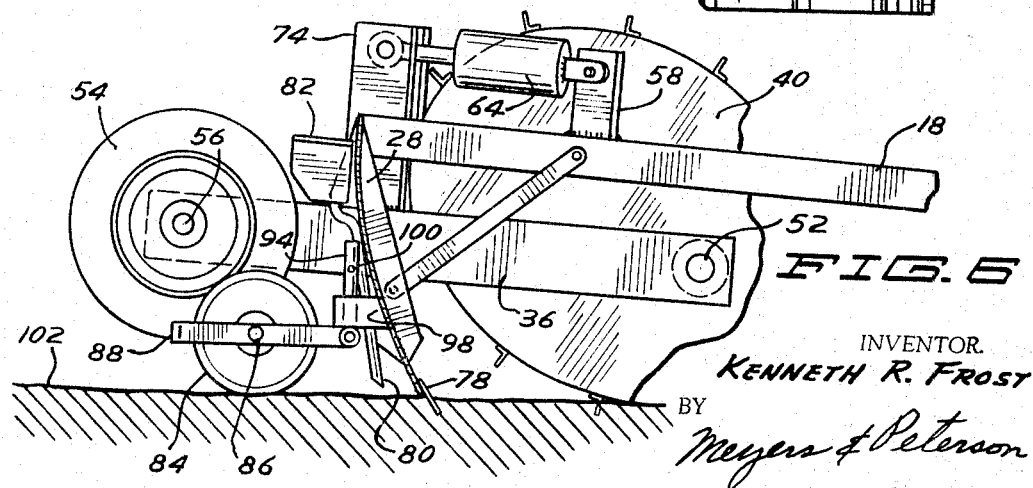
INVENTOR.
KENNETH R. FROST
BY
Meyers & Peterson
ATTORNEYS

United States Patent Office 3,316,980
Patented May 2, 1967

3,316,980
BASIN FORMING MACHINE FOR RANGE
RESEEDING
Kenneth R. Frost, Agr. College, University of Arizona,
Tucson, Ariz. 85721
Filed July 15, 1964, Ser. No. 382,772
10 Claims. (Cl. 172—90)

This invention relates generally to a machine for forming water-receiving basins on the open range in regions of low rainfall.

One object of the invention is to provide a machine for attachment to a tractor which when towed or pulled over the ground will automatically form grooved basins of the proper shape, size and location in order to catch as much rain as possible in arid and semi-arid regions. More particularly, it is an aim of the invention to provide a machine that would normally be used on untilled land of natural slope with the basins being placed in rows on the contour, the basins sloping uphill to receive the run-off.

Another object is to provide a machine having controls for the basin-forming blade that will allow basins to be formed when the machine is traveling in either direction. Not only is it possible to traverse the ground in a reverse direction, but the same controls can be utilized in rendering the blade of the machine ineffectual so that the machine can be readily pulled along the highway at relatively high speeds in order that widely scattered regions can be grooved. Stated somewhat differently, provision is made for raising either side of the machine and this arrangement allows the machine to be moved back and forth over a given area, yet when the controls are actuated so that both sides of the machine are held in an elevated condition, the machine is easily moved from place to place.

Yet another object of the invention is to provide a machine that not only forms the basins as it advances over the ground or terrain, but which will seed the soil at the same time.

Still another object of the invention is to provide a machine which is simple, rugged and not apt to get out of order easily.

Since a machine constructed in accordance with the teachings of the present invention will find especial utility only in certain geographical areas, it should be explained further that the machine will form basins that are usually spaced at five to six foot intervals and approximately five feet in width in the direction of travel and from four to six feet laterally, the basins sloping from a zero inch depth to six or eight inches on the downgrade side. Rows of basins are variously spaced depending on the steepness of slope, the type of soil and the storm intensity and rainfall. Two to four rows of basins are placed adjacent each other with ten to twenty feet between each group. With the planting or seeding feature incorporated into the machine that is contemplated with the present invention, the basins formed will collect the water and the seed that is deposited will thereby be encouraged to germinate and grow even though small annual amounts of rainfall are experienced. Consequently, the invention has for a broad object the improvement of open range country so that the number of cattle that can be supported on a given area of land can be increased with only a minimum expenditure of time and effort.

These and other objects and advantages of my invention will more fully appear from the following description, made in connection with the accompanying drawings, wherein like reference characters refer to the same or similar parts throughout the several views and in which:

FIGURE 1 is a side elevational view of the machine with the cam-shaped wheel lifted and the trailing wheel lowered in order to support the weight of one side of the machine;

FIGURE 2 is a rear view of the machine showing the trailing wheel lowered at the right, which is the condition of this wheel in FIGURE 1, and the trailing wheel at the left raised so as to permit engagement of the cam-shaped wheel with the ground, this being the relationship of the parts when forming basins;

Figure 3:
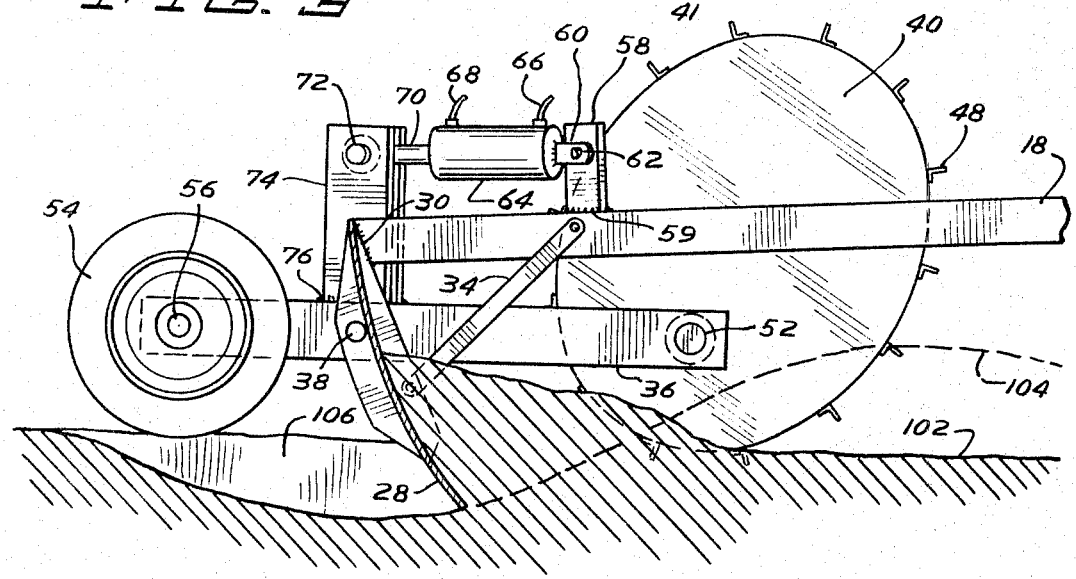
FIGURE 3 is a side elevational view, partly in section, taken in the direction of line 3—3 of FIGURE 2 but illustrating the cam-shaped wheel advanced somewhat from the position in which it appears in FIGURE 2 and therefore slightly elevated with respect to said FIGURE 2.
Figure 4:
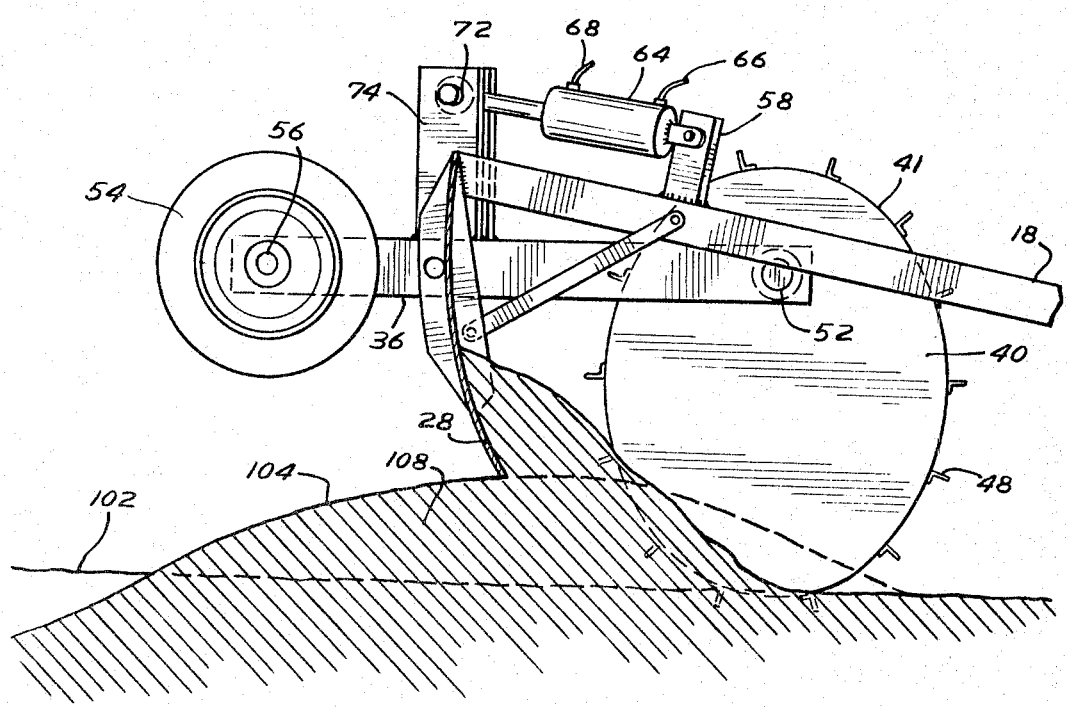

FIGURE 4 corresponds to FIGURE 3 but illustrates the machine in a still more advanced position, the blade in this view depositing the soil removed from the basin depicted in FIGURE 3;

FIGURE 5 is a top plan view of my machine, the seeding equipment being added thereto which has been omitted from FIGURES 1, 3 and 4 for reasons of drafting simplicity, and FIGURE 6 is a sectional view taken in the direction of line 6—6 of FIGURE 5.

Referring now to FIGURE 1, a tractor 10 has been illustrated fragmentarily which tractor has a rearwardly extending drawbar 12. The machine exemplifying the present invention has been denoted in its entirety by the reference numeral 14. The machine comprises an elongated frame 16 having parallel side members 18 and a cross member 20 at its forward end which has been illustrated in dotted outline in FIGURE 1 as being an angle iron. To the forward end of the frame is secured a hitch 22 having a socket portion 24 for the accommodation of a ball 26 that projects upwardly from the drawbar 12. It will be appreciated that a rudimentary form of hitch has been shown in order to simplify the drawings as much as possible. The prime requisite of any hitch in this instance is that it afford a swivel-type action for a purpose that will be more readily understood as the description progresses.

The machine 14 includes a transverse scraper blade 28 welded at its upper end to the rear ends of the side members 18 as indicated at 30. There is a flange 32 at each side or lateral end of the blade 28, corresponding ends of a pair of inclined braces 34 being secured to these flanges and the other ends of said braces 34 being secured to the side members 18. In this way, the blade 28 is fixedly carried at the rear of the elongated frame 16 and moves vertically in accordance with the up and down movement of the rear end of this frame, all as will be clearly evident from the additional description to be presented.

At this time, attention is directed to the presence of a tilt beam 36 located at each side of the machine. The tilt beam 36 in each instance is rendered pivotal by a pivot pin 38. Inasmuch as the pivot pins 38 are located intermediate the ends of the tilt beams 36, these beams can be swung in vertical planes so that one end thereof will go up and the opposite end goes down.

Carried at the forward end of each tilt beam 36 is a cam-shaped wheel 40 having a non-circular periphery 41. From FIGURE 1, it can be seen that the major axis of the cam-shaped wheel is denoted by the ribs 42a, 42b. These ribs, along with additional ribs 44, reinforce the wheel 40. The ribs 42a, 42b have been specifically mentioned because they happened to constitute or form the major axis. The minor axis is defined by a pair of cleats 46a, 46b. Here again, additional cleats 48 are disributed or spaced about the periphery 41 so that each am-shaped wheel 40 will grip or engage the ground in a non-slipping manner. A hub or sleeve 50 integral with each cam-shaped wheel 40 renders the wheels rotatable about an eccentric axis provided by an axle or stub shaft 52 at each side of the machine.

Whereas the cam-shaped wheels 40 are non-circular, a pair of trailing wheels 54 having a circular periphery 55 are rotatably mounted at the other end of the tile beams 6 through the agency of axles or stub shafts 56.

An upstanding bracket 58 on each of the side frame members 18 is secured to its particular side frame member as by welding at 59. Associated with each bracket 58 is a clevis 60, a pin 62 providing engagement of the clevis with its respective bracket. A hydraulic cylinder 64 has its closed end attached directly to a clevis 60. The hydraulic cylinders 64 have hydraulic lines 66, 68 connected thereto in order to project or retract a piston rod labelled 70. The piston rod 70 carries at its free end a pivot pin 72 which extends through the upper ends of a pair of upstanding parallel arm elements 74, these arm elements being secured at their lower end as by welding at 76.

As can be seen from FIGURES 5 and 6, a plurality of grooving spikes 78 are secured to the lower edge of the scraper blade 28; these spikes have not been shown in FIGURES 1, 2, 3 and 4 in order to simplify the drawings. For the same reason, the seed tubes 80 shown in FIGURES 2 (three have been made visible by removal of parts hereinafter described), 5 and 6 have been omitted from the other views. Each seed tube 80 is connected at its upper end to a seed box 82. A rearwardly located presswheel 84, as best seen in FIGURE 5 (three presswheels have been omitted from FIGURE 2 as indicated above), follows the lower ends of the seed tubes 80, each presswheel 84 being rotatably mounted on an axle or shaft 86. The axle or shaft 86 is in turn carried by a U-shaped bracket 88 that is free to pivot about a transverse axis provided by a pin 90 which extends through a horizontal sleeve 92. Extending upwardly from the sleeve 92 in each instance is a vertical shaft 94. The shaft 94 is received in a tubular bearing block 96, welded to the backside of the blade 28 as indicated at 98. A radially projecting pin 100 keeps the shaft 94 in each instance from becoming disengaged from the bearing block 96.

Having presented the foregoing information, the manner in which my machine operates or functions should be readily understood. When the machine is to be transported along a highway or from one area to another in contemplation of forming basins in a given area, both hydraulic cylinders 64 will have fluid supplied thereto under pressure through the lines 66, thereby urging the piston rods 70 rearwardly. Such action causes the tilt beams 36 at each side of the machine to be rotated or pivoted in a counterclockwise direction about their pivot pins 38 as viewed in FIGURE 1. This has the consequence of causing the trailing wheels 54 at both sides of the machine to be forced downwardly against the ground 102. This action in turn raises the cam-shaped wheels 40 at both sides. When in this condition, the entire machine 14 can be easily pulled because all of the weight is then resting on the trailing wheels 54 which have circular peripheries 55.

However, when the machine 14 is to be used for basin forming purposes, one or the other cam-shaped wheels 40 is maintained in engagement with the ground. This is accomplished by rotating the particular tilt beam 36 in a clockwise direction as viewed in FIGURE 1. Assuming that it is the particular wheel 40 on the far side of the machine 14 as viewed in FIGURE 1, that is to engage the ground, then the wheel 54 at that side would be raised, thereby causing the wheel 40 at that side to be lowered (see FIGURE 2, as well as FIGURES 3 and 4).

Owing to the eccentric location of the axle or shaft 52, it will be understood that the cam wheel 40 will cause the frame 16 to be raised and lowered by virtue of the offset or eccentric location of the axle 52. To illustrate how the frame 16 moves upwardly and downwardly as the machine 14 is pulled or towed over the ground, the path traversed by the scraper blade 28 has been indicated by the reference numeral 104 in FIGURES 3 and 4. It will be observed that in FIGURE 3 the scraper blade 28 is in the process of scooping out one basin 106 and has moved approximately two-thirds of the way in the formation of this basin labelled 106. On the other hand, in FIGURE 4, the blade has moved to practically its uppermost point along the path 104, thereby depositing soil removed from the basin 106 into the form of a mound 108. The mound 108, in each instance, serves as a dam for preventing water from escaping from the basin 106; this is particularly desirable where the ground slopes appreciably and it will be recognized that for the sake of convenient illustration the ground 102 has been shown as virtually level or horizontal.

From FIGURE 2, it will be discerned that the left side of the machine 14 is lowered sufficiently so that the cam wheel 40 at that side is always in engagement with the ground 102. It is not necessary that the cam wheel 40 be in engagement at all times with the ground, for it is possible to maintain the position of the trailing wheel 54 such that the length of the basin perpendicular to the line of travel, this being the length shown in FIGURE 2, can be shortened by not permitting the blade 28 to scrape downwardly to the maximum possible depth. Consequently, the length that the blade 28 is exposed to the soil can be controlled, this being easily done by either or both of the hydraulic cylinders labelled 64.

One important feature of the invention resides in the ability of the machine to be reversed as far as its direction is concerned. It will be apparent that when progressing in one direction with the scraper blade 28 in the position pictured in FIGURE 2 will cause a basin to be formed having its maximum depth at the left. When the machine 14 is caused to travel in an opposite direction, the blade 38, through the agency of the hydraulic cylinders 64, can be tilted in an opposite direction so that the basin will be continued on the reverse path of the machine 14 over the terrain adjacent to the terrain where the first series of basins is formed.

Naturally, the construction of the hitch 22 should be such as to allow a "twisting" or swiveling of the frame 16 with respect to the vehicle 10, the depicted hitch being only exemplary. Although the spikes 78 have been omitted in FIGURES 1, 3 and 4, it will be apparent, especially from FIGURE 6, that these spikes, due to the fact that they are mounted on the blade 28, form grooves as the blade 28 is moved along in the formation of the various basins. Still further, because the seed tubes 80 are located directly behind the grooving spikes 78, seed is deposited in these grooves from the seed box 82. It is the function of the various press-wheels 84 to press the seed into the grooved ground, thereby enhancing the chances of germination thereof. The presswheels 84 can move upwardly and downwardly due to the pins 90 and can swivel or oscillate to either side by virtue of the vertical shafts 94. Thus, the wheels are constrained to follow the particular contour of the ground, doing so in accordance with the direction taken by the respective spikes 78.

In summation, it will be recognized that the scraper blade 28 is fixedly carried at the rear of the elongated frame 16 and that it is compelled to move in unison with the rear portion of the frame as the frame is actuated vertically due to the eccentricity of the cam-shaped wheels 40. When the particular trailing wheel 54 at one side is raised, then due to the mounting of the cam-shaped wheel 40 at the other end of a particular tilt beam 36, it follows that the frame 16 at that particular side is caused to move upwardly and downwardly so that the lower edge of the blade 28 follows the undulated or wavy path labelled 104. Consequently, a series of spaced basins 106 are produced. Still further, depending upon the lateral inclination imparted to the scraper blade 28 through either or both of the hydraulic cylinders 64, the length of the basin 106 is governed. Since either end of the blade 28 can be used to scrape the soil, it follows that basins can be formed while the machine 14 is traveling in either direction along a given contour line. With the equipment for depositing seeds in operation, the machine 14 is capable of reseeding relatively barren land for range purposes, doing so in a minimum amount of time and with little effort.

It will, of course, be understood that various changes may be made in the form, details, arrangements and proportions of the parts without departing from the scope of my invention as set forth in the appended claims.

What is claimed is:

1. A basin forming machine comprising:
   (a) an elongated frame;
   (b) means at one end of the frame for pulling said machine;
   (c) a scraper blade at the other end of said frame;
   (d) a non-circular ground engaging wheel;
   (e) an axle about which said wheel rotates;
   (f) a beam pivotally connected intermediate its ends to said frame;
   (g) means supporting said axle adjacent one end of said beam;
   (h) a circular ground engaging wheel rotatably connected to said beam adjacent its other end, and
   (i) power means for pivoting said beam in a direction to force said circular wheel downwardly against the ground and thereby lift said non-circular wheel away from the ground.

2. A basin forming machine in accordance with claim 1 in which said power means includes:
   (a) a hydraulic cylinder mounted on said frame, and
   (b) a piston rod connected to said beam.

3. A basin forming machine in accordance with claim 2 including:
   (a) an arm fixed carried on said beam,
   (b) said piston rod being pivotally connected to said arm.

4. a basin forming machine comprising:
   (a) an elongated frame adapted to be pivotally hitched to a towing vehicle at one end;
   (b) a pair of cam-shaped wheels at either side of said frame adjacent the other end thereof;
   (c) means for selectively causing either of said wheels to contact the ground, and
   (d) a transverse scraper blade carried by said frame adjacent its said other end,
   (e) whereby the end of said scraper blade nearer the wheel in contact with the ground will be raised and lowered as the frame is advanced relative to the ground.

5. A basin forming machine in accordance with claim 4 in which said selective means includes:
   (a) a pivotal beam at each side of said frame;
   (b) an axle on each of said beams at one end thereof for journaling one of said cam-shaped wheels;
   (c) a circular wheel on each of said beams at the other end thereof, and
   (d) a hydraulic cylinder piston associated with each of said beams for causing either of said beams to pivot to thereby cause the particular cam-shaped wheel mounted on the beam being actuated to either contact the ground or be lifted therefrom depending upon whether the circular wheel on that beam is either raised or lowered.

6. A basin forming machine comprising:
   (a) frame means;
   (b) a wheel eccentrically connected to said frame means so that a portion of the frame means is successively raised and lowered as the wheel advances along the ground;
   (c) a scraper blade supported on said frame portion having transversely spaced spike elements projecting downwardly from its lower edge;
   (d) a seed tube disposed rearwardly of each spike element, and
   (e) a presswheel disposed rearwardly of each seed tube.

7. A basin forming machine in accordance with claim 6 including:
   (a) means mounting each presswheel for vertical and pivotal movement.

8. A basin forming machine comprising:
   (a) frame means adapted to be pulled along the ground from one end;
   (b) a transverse scraper blade adjacent the opposite end of said frame means;
   (c) a non-circular ground engaging wheel at one side of said frame means for raising and lowering said frame means side as said frame means is pulled along the ground, and
   (d) ground engaging means at the other side of said frame means for supporting said other frame means side at a relatively constant distance above the ground,
   (e) whereby the end of said scraper blade nearer said one side of the frame means follows an undulated path and the end of said scraper blade nearer the said other side of the frame means follows a relatively straight path.

9. A basin forming machine in accordance with claim 8 in which:
   (a) said ground engaging means includes a circular wheel.

10. A basin forming machine in accordance with claim 9 including:
    (a) a second non-circular ground engaging wheel, said second non-circular wheel being at the other side of said frame means;
    (b) a second circular ground engaging wheel, said second circular wheel being at said one side of said frame means, and
    (c) respective means for urging either of said circular wheel against the ground to elevate the non-circular wheel at that particular side from the ground.

References Cited by the Examiner

UNITED STATES PATENTS

| 2,021,343 | 11/1935 | Wetzel | 172—90 |
| 2,837,989 | 5/1958 | Gann | 172—30 X |
| 2,852,995 | 9/1958 | Domries | 172—90 |

ABRAHAM G. STONE, *Primary Examiner.*

J. O. OAKS, *Assistant Examiner.*